(12) United States Patent
Fritzsch et al.

(10) Patent No.: US 10,746,217 B2
(45) Date of Patent: Aug. 18, 2020

(54) TWO-PART PLUG-IN COUPLING FOR CONNECTING COMPONENTS

(71) Applicant: BÖLLHOFF VERBINDUNGSTECHNIK GmbH, Bielefeld (DE)

(72) Inventors: Jasmin Fritzsch, Halle (DE); Michael Kahre, Herford (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 0 days.

(21) Appl. No.: 15/754,767

(22) PCT Filed: Jul. 28, 2016

(86) PCT No.: PCT/EP2016/068113
§ 371 (c)(1),
(2) Date: Feb. 23, 2018

(87) PCT Pub. No.: WO2017/032545
PCT Pub. Date: Mar. 2, 2017

(65) Prior Publication Data
US 2018/0252252 A1  Sep. 6, 2018

(30) Foreign Application Priority Data
Aug. 25, 2015 (DE) .................. 20 2015 005 870 U

(51) Int. Cl.
*F16B 21/07* (2006.01)
*F16B 21/08* (2006.01)
(52) U.S. Cl.
CPC .......... *F16B 21/078* (2013.01); *F16B 21/073* (2013.01); *F16B 21/075* (2013.01); *F16B 21/086* (2013.01)

(58) Field of Classification Search
CPC .... F16B 21/073; F16B 21/075; F16B 21/078; F16B 21/086
See application file for complete search history.

(56) References Cited

U.S. PATENT DOCUMENTS 3,551,963 A  1/1971  Mosher, Jr. et al.
3,611,861 A  10/1971  Schulze
(Continued)

FOREIGN PATENT DOCUMENTS

DE  1900695 A1  4/1970
DE  3232926 A1  3/1984
(Continued)

OTHER PUBLICATIONS

Written Opinion & International Search Report for PCT/EP2016/068113 dated Oct. 14, 2016, 11 pages.
(Continued)

*Primary Examiner* — Robert Sandy
*Assistant Examiner* — David M Upchurch
(74) *Attorney, Agent, or Firm* — Reising Ethington P.C.

(57) ABSTRACT

A coupling element of a two-part plug-in coupling has a head section from which a female connection structure extends perpendicularly in an installation direction of the coupling element, with a locking web projecting inwards on an inner side so that a male bolt element can be inserted into the connection structure opposite to the installation direction and can be locked there, or a male cylinder-like connection structure extends so that the male cylinder-like connection structure can be inserted in a female receiving element and can be locked there. The coupling element has an integral locking structure which has a circumferential, or a plurality of locking webs which, together with the head section, form an installation gap for receiving the component, so that the female or the male coupling element can be locked in the (Continued)

Figure 1:
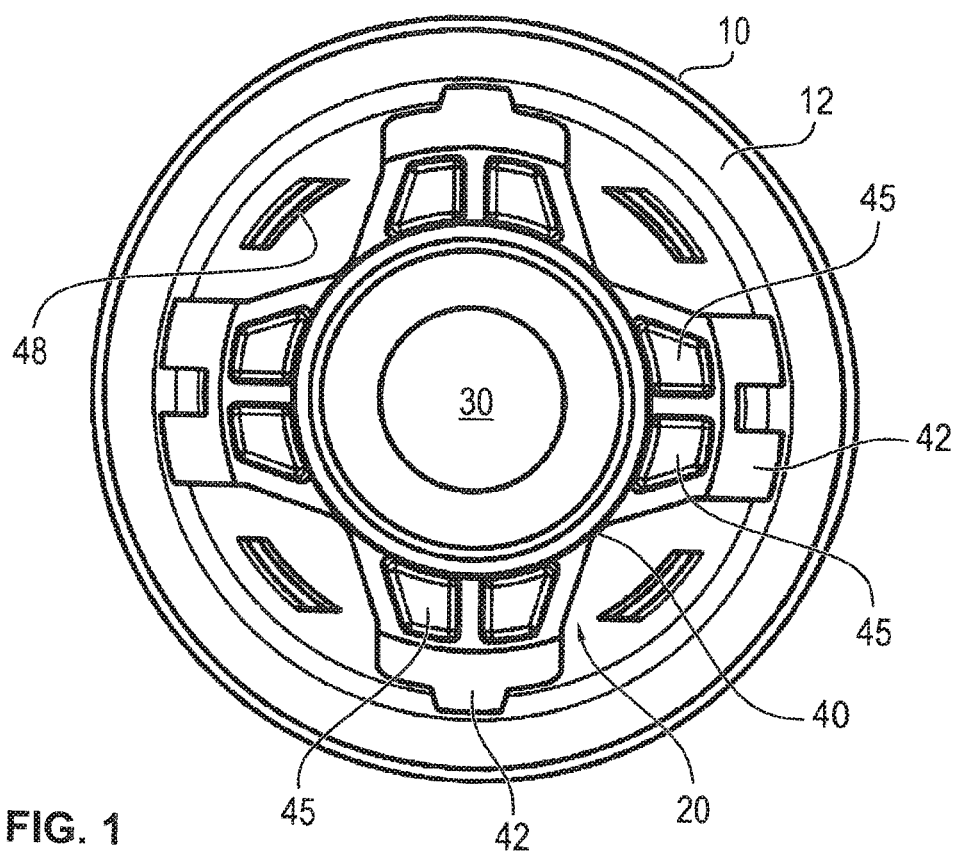

opening of the component with a relative movement in installation direction between coupling part and component.

17 Claims, 6 Drawing Sheets

(56) References Cited

U.S. PATENT DOCUMENTS

| | | | | |
|---|---|---|---|---|
| 3,916,756 A * | 11/1975 | Yoda | ............... | F16B 21/073 |
| | | | | 24/682.1 |
| 4,697,833 A * | 10/1987 | Swift | ............... | G09F 3/0311 |
| | | | | 24/16 PB |
| 4,847,959 A * | 7/1989 | Shimada | ............ | A44B 17/0011 |
| | | | | 24/671 |
| 5,647,713 A | 7/1997 | Ge et al. | | |
| 6,431,585 B1 * | 8/2002 | Rickabus | ............ | B60R 21/215 |
| | | | | 24/114.05 |
| 8,322,001 B2 * | 12/2012 | Ehrhardt | ............ | B60R 13/0206 |
| | | | | 24/289 |
| 8,403,356 B2 | 3/2013 | Tago et al. | | |
| 8,640,385 B2 | 2/2014 | Sawatani et al. | | |
| 8,776,326 B2 * | 7/2014 | Clarke | ............... | B60R 13/0206 |
| | | | | 24/297 |
| 2011/0296764 A1 | 12/2011 | Sawatani et al. | | |
| 2012/0284975 A1 | 11/2012 | Clarke et al. | | |
| 2015/0096155 A1 | 4/2015 | Ernst | | |

FOREIGN PATENT DOCUMENTS

| | | |
|---|---|---|
| DE | 19721314 A1 | 11/1997 |
| DE | 20107949 U1 | 10/2001 |
| DE | 202006015982 U1 | 12/2006 |
| EP | 2841772 A1 | 3/2015 |
| FR | 2932235 A1 | 12/2009 |
| GB | 1332397 A | 10/1973 |
| GB | 2210403 A | 6/1989 |
| GB | 2375568 A | 11/2002 |
| WO | WO2010095734 A1 | 8/2010 |
| WO | WO2011068769 A1 | 6/2011 |
| WO | WO2013159977 A1 | 10/2013 |

OTHER PUBLICATIONS

English translation of the International Preliminary Report on Patentability for PCT/EP2016/068113 dated Feb. 27, 2018, (7 pages).
CN Office Action for CN Application No. 201680056978.7 dated Oct. 9, 2019 (9 pages).
EP Office Action for EP Application No. 16748094.6 dated Feb. 12, 2020 (6 pages).

* cited by examiner

TWO-PART PLUG-IN COUPLING FOR CONNECTING COMPONENTS

1. TECHNICAL FIELD

The present disclosure relates to a two-part plug-in coupling consisting of a male and a female coupling element. Furthermore, the present disclosure relates to a connection method for a first and a second component by means of this plug-in coupling and a manufacturing method for a female coupling element.

2. BACKGROUND

In the prior art, various types and constructions of plug-in couplings are known, with which a first and a second component can be connected. With the help of the construction of the plug-in coupling, an individual adaptation to the components to be connected is made.

For example, U.S. Pat. No. 8,403,356 discloses a plug-in coupling for fastening an interior paneling structure consisting of at least three parts in the motor vehicle. An intermediate part is used, for example, to realize the distance between the two components to be connected with each other. Furthermore, a male coupling element is used which, similar to a nail, has a large-surfaced head. This male coupling element alone is not able to hold itself in a component opening. Only the combination with an attached and then locked onto female coupling element ensures the hold in a component opening and the possibility of a connection with another component. Accordingly, a pre-installation of the individual coupling elements in the respective components is not possible, instead, together with the installation of the coupling elements on the respective component, the assembly of the coupling elements and components must follow as well.

Further, DE 197 21 314 A1 describes a two- or multi-part plug-in coupling, which for example also uses a bolt with a ball head, which, thus, is a male coupling element in combination with a ball socket in a female coupling element. The female coupling element comprises some disc-shaped elements as a head, which, lying opposite to each other, form a gap between them. This gap serves to receive or insert the coupling in an edge slot of a component. Thus, the edges of the edge slot are guided rail-like in the two disc-shaped elements. This results in a position specification of the coupling in the edge region of a component. An installation of this coupling in an arbitrarily placed component opening is therefore not possible. The opposite male coupling part is locked, for example, in a component opening, or glued into this, in order to then connect the plug-in coupling.

A similar attachment of a female coupling element is shown in FR 2 932 235. Here, also an elastically formed ball socket is provided, which has an annular fastening groove for attachment, for example, on a screen. This fastening groove can be slid into lateral slots of the component, wherein after installation of the female coupling element, the coupling element protrudes far beyond the component level. Since the ball socket protrudes beyond the component surface, the ball socket can deform with the ball head installed therein and damp vibrations. This vibration damping is ensured simultaneously by additional recesses parallel to the cavity by inserting the male coupling element.

GB 1 332 397 discloses an, although only distant, yet simple construction of a plug-in coupling in the field of snap fasteners. Both male and female coupling element have a flat head, so that the ball head of the male coupling element and the ball socket of the female coupling element are covered by the flat head. In order to secure the coupling elements in corresponding sections of material, spring washers are pushed onto cylindrical portions of the coupling elements. In this respect, these coupling elements do not provide fastening options with their assigned components or material parts through their own integral structure. Here, as well, the connection of the two coupling elements is made via a snap-lock connection between the male and female coupling element.

Another two-part plug-in coupling is disclosed in DE 201 07 949 U1. A female coupling element consisting of an elastic material is used in an installation direction in a component opening. To assist the installation, the female coupling element has a conical shape tapered in the installation direction. In order to support the grip of the female coupling element and not to push the female coupling element beyond the component opening, a flange extending perpendicularly to the installation direction limits the insertion movement in the installation direction. Within the female coupling element, a ball socket is provided, in which a male coupling element, in particular a bolt with a ball head, can be locked. In order to establish a connection between two components, the bolt with ball head is also locked in installation direction in the female coupling element. Thus, in addition to the preparation of the connection between the components, the insertion movement of the bolt with ball head in the ball socket also supports the installation and the firm seat of the female coupling element in the component opening. But here, again, the female coupling element protrudes beyond the component surface. This allows a certain mobility of the ball head of the male coupling element after the installation took place, since the ball head is elastically movable and deflectable together with the largest part of the female coupling element above the component surface. Due to the commutated installation direction of the female coupling element and the establishing of the connection between the female and the male coupling element, the two components are connected with each other in two-sided accessibility.

The coupling structures described above are aesthetically unpretentious especially in their exterior view and often disturb the appearance of the two components connected with each other. Furthermore, a disadvantage arises from that, for establishing the connection between the two components, these components must be accessible from both sides. Otherwise, it would be difficult to install the coupling elements of the plug-in coupling in the two components and to establish the connection.

It is therefore the object of at least certain implementations of the present disclosure to provide an aesthetically appealing plug-in coupling, which at the same time facilitates the establishment of a connection between two components.

3. SUMMARY

The above object is achieved by a coupling element according to claim 1, by a two-part plug-in coupling according to claim 10 and by a connection between a first and a second component via the two-part plug-in coupling according to claim 11. Advantageous embodiments and further developments of the present disclosure will become apparent from the following description, the drawings and the appending claims.

The present disclosure comprises a two-part plug-in coupling, which has a male bolt element with a latching head, in particular a bolt with ball head, and a female coupling element; or a female receiving element and a male coupling element; or a female coupling element and a male coupling element; wherein the male and female coupling element are each arranged in a component opening. The coupling element comprises the following features: a face-like head section, from which a female hollow-cylinder-like connection structure extends perpendicularly in an installation direction of the coupling element, which surrounds a radially inwardly protruding connecting web on a radial inner side, so that a male bolt element, in particular a bolt with ball head, can be inserted and locked in the hollow-cylinder-like connection structure against the installation direction, or a male cylinder-like connection structure extends, comprising an axially extending bolt with a latching head so that the male cylinder-like connection structure can be inserted and locked in a female receiving member, wherein, on a radial outer side, said coupling element comprises an integral locking structure with a circumferentially or a plurality of uniformly arranged outwardly projecting springy locking webs, which, together with the head section, form an installation gap for receiving the component, so that the female or male coupling element can be latched in the opening of the component with a relative movement between the coupling part and component in the installation direction.

According to different embodiments of the disclosure, the above-mentioned coupling element is of male or female structure. It can be installed via the face-like head section in a nearly aligned arrangement with respect to the component surface in the component. This means that a component opening in which the female or male coupling element is installed, is substantially covered by the face-like head section. This construction allows for the possibility that the face-like head section extends only slightly beyond the component surface and thereby does not adversely affect its aesthetic appearance. In addition, it may be possible to make the face-like head section so that it introduces aesthetic design elements in the established connection. Such designs include, for example, a flat, colored, structural or haptic design of the head section facing away from the male coupling element to be installed. Furthermore, the head section may be formed functionally as an eyelet, hook, closing element or the like. In addition, the head section may have the shape of a hemisphere, a sphere, a cuboid, a cone, a pyramid, a company logo or a figure.

The connection between the female coupling element and a male bolt element or coupling element is established via the hollow-cylinder-like connection structure. This hollow cylinder-like connection structure may be arranged below the head section, so that it does not protrude out of the component surface. This hollow-cylinder-like connection structure has a radial inner side, which serves for connecting to the male coupling element. The radial inside may have a ball socket, in which the ball head of a ball bolt or a latching head of the male bolt member or the male coupling element can be supported. Further, a locking web protrudes radially inwards so that the latching head or the ball head can be locked within the hollow-cylinder-like connection structure.

In a further constructive embodiment, the radial outer side of the hollow-cylinder-like connection structure or the cylinder-like connection structure is characterized by an integrally formed locking structure. This integral locking structure serves to fasten the female coupling element in the opening of the component. Since the female coupling element is to be installed as simply as possible in the component opening, the integral locking structure forms a latching structure by means of a circumferential or a plurality of uniformly arranged outwardly projecting springy locking webs, so that, by pressing the female coupling element in the component opening in installation direction, these locking webs lock at the edge of the component opening. Therefore, the circumferential locking web or the plurality of locking webs with the bottom side of the head section facing the hollow-cylinder-like connection structure form the installation gap in which the edge of the component opening of the component is received. Once the female coupling element is locked in the component opening, the head section in one direction and the locking webs in the other direction form an undercut against the detachment of the female coupling element from the component opening. Therefore, inserting the male bolt element or coupling element into the interior of the hollow-cylinder-like connection structure against the installation direction does also not cause the female coupling element to be released from the component opening.

The male coupling element has the same characteristics as the female coupling element in order to fasten the male coupling element in the opening of a component. Therefore, all information presented with respect to the female coupling element applies equally to the male coupling element. The male coupling element differs from the female coupling element only in terms of the connection structure, which is arranged in installation direction below the head section. This male connection structure is constructed in a cylinder-like manner in contrast to the female hollow-cylinder-like connection structure. This means that it is filled in the radial interior. Therefore, the male cylinder-like connection structure can also form an axially extending bolt with a latching head. This latching head, which may be a ball head, is adapted to be received in a female receiving element of a known plug-in coupling, as is generally known from the prior art discussed.

It is of advantage that the coupling element, be it male or female, can also be installed with only one-sided accessibility of the component opening of the component. Inserting the coupling element in the component opening and the independent locking of the locking webs is sufficient to reliably keep the coupling element in the component opening.

According to an embodiment of the coupling element, the circumferential or the plurality of locking webs define support surfaces extending opposite to the head section, which limit the installation gap. Exactly these support surfaces form the above-mentioned undercut against a force effect opposite to the installation direction, so that the coupling element cannot be detached or released from the component opening.

According to a further embodiment, the circumferential or the plurality of locking webs comprise inlet bevels declined in installation direction, so that the locking web or the locking webs is/are tapered in the installation direction. The circumferential or the plurality of locking webs may have at least one inner cavity, so that the locking webs are radially inwardly deformable.

Based on the special construction of the locking webs described above, the inlet bevels are supported by the edges of the component opening during the installation process. So that the coupling element can be installed firmly in the component opening, the locking webs must first be pressed radially inwards during installation in order to be able to return to their original position due to their elastic material design after arrangement of the component in the installation gap. This purposeful deformation of the locking webs is ensured on the one hand by the material design of the coupling element. The coupling element may be made of elastomeric plastic, which provides the desired elastic and springing properties. Further, the inlet bevels ensure at all times a sufficient grip of the edges of the component opening, by means of which the latching webs are pressed radially inwards. In addition, since the latching webs may have at least one inner cavity, the mechanical loads applied by the edges of the component opening are sufficiently large to deform the latching webs radially inwardly. However, in addition to the installation of the coupling element in the component opening, this deformation at the same time ensures the reliable locking of the female and male coupling element in the component opening. Depending on the size of the cavity or the number of cavities within a locking web, the deformation behavior of a single locking web under mechanical stress through the edge of the component opening is adjustable. In this case, the load-bearing mechanical vibrations later applied by the two components connected with each other on the two-part plug-in coupling can also be taken into account. If these component vibrations represent a strong mechanical load for the two-part plug-in coupling, then the holding forces of the locking webs are adjusted more strongly respectively by smaller cavities within the locking webs.

According to a further embodiment of the coupling element, the connection structure has a round or an angular outer contour in adaptation to a shape of the opening in the component. Depending on the components to be connected with each other, it may be preferable to implement the component opening with a round or angular shape. Accordingly, it may be necessary that the coupling element perfectly fits in this component opening. For this purpose, the hollow-cylinder-like connection structure may be adapted in its shape to the component opening in order to minimize existing space between the component opening and the hollow cylinder-like connection structure, since this supports a firm grip of the coupling element in the component opening. Therefore, in accordance with a different embodiment, the outer contour of the hollow-cylinder-like connection structure is, for example, designed to be round in the case of a round component opening and is quadrangular in the case of a quadrangular component opening. The outer contour of the hollow-cylinder-like or cylinder-like connection structure may be implemented and dimensioned in adaptation to the shape of the component opening.

According to a further embodiment, the head section extends in radial direction with respect to an axial longitudinal axis of the coupling element beyond a radial or lateral extent of the locking web or the locking webs. In this way, it may be ensured that the head section covers the entire component opening. With this construction both aesthetic and technical advantages are achieved. Technically, the head section provides additional sealing of the component opening to the outside. This avoids, for example, that liquids or dust can penetrate into the component opening. Aesthetically, this construction may ensure a uniform component surface with the female or male coupling element, because the component surface is only influenced by the visible upper sides of the head section. Since structure, color design and choice of material can be adapted to the component by means of this head section, a great variety of aesthetic designs can be realized with the aid of the face-like head section.

In this context, the head section may provide a closed face opposite to the installation direction, which has a round or angled shape. According to another embodiment, the head section has an axial thickness adjacent to the installation gap and opposite to the installation direction in the range of 5 to 25% of a total axial length of the coupling element. It is apparent from this thickness configuration of the head section that the head section may protrude only slightly beyond the surface of the component, in which the female or male coupling element is installed. This supports not only a specific aesthetic design but also a space-saving arrangement of the plug-in coupling, since this is located essentially below the component with component opening.

According to a further embodiment, the radial inner side of the female hollow-cylinder-like connection structure is equipped with a ball socket and the latching web runs continuously in the circumferential direction or with cutouts. In comparison, the male cylinder-like connection structure is bolt-shaped or web-shaped. At the axially opposite end of the head section, it has a thickening compared to the rest of the cylinder-like portion. The thickening, which may be a ball head or latching section, is adapted to be received and locked in a ball socket or similar construction.

In addition, the present disclosure comprises a two-part plug-in coupling, which has a male bolt element with a latching head, in particular a bolt with ball head, in combination with a female coupling element with a female hollow-cylinder-like connection structure according to one of the above-described embodiments; or a female receiving element in combination with a male coupling element with a male cylinder-like connection structure according to one of the preceding embodiments in combination with a male coupling element with a male cylinder-like connection structure according to one of the preceding embodiments; or a female coupling element having a female hollow-cylinder-like connecting structure according to one of the preceding embodiments in combination with a male coupling element having a male cylinder-like connection structure according to one of the preceding embodiments. As has already been explained above, a male and a female coupling element are each arranged in a component opening of the corresponding component. From the above description it follows that the male bolt member and the female receiving element can also be formed by a male coupling element and a female coupling element. In these cases, a component opening is also provided in the other component in order to arrange and to fasten the corresponding coupling element in the component.

The present disclosure also comprises a connection between a first component and a second component via the two-part plug-in coupling, in which the first component is equipped with a male bolt element with a latching head and the second component comprises a female coupling element installed in a component opening according to one of the above-mentioned embodiments; or in which the first component is equipped with a female receiving element and the second component has a male coupling element installed in a component opening according to one of the above embodiments; or in which the first component comprises a female coupling element installed in a component opening and the second component has a male coupling element installed in a component opening according to one of the above embodiments.

The present disclosure additionally comprises a connection method between a first component with a male bolt element with a latching head or with a female receiving element and a second component with a component opening. The connection method comprises the following steps: inserting a female or male coupling element into the component opening of the second component in an installation direction, so that a head section of the female or male coupling element is supported on a surface of the second component and a hollow-cylinder-like or a cylinder-like connection structure in installation direction reaches through the component opening, and latching the female or male coupling element via an installation gap of an integral locking structure of the female or male coupling element on the second component, wherein the locking structure is formed on a radial outer side of the connection structure, locking the latching head of the male bolt element at a radially inwardly projecting locking web in the interior of the hollow-cylinder-like connection structure by a relative movement of the male coupling element related to the female coupling element in a connection direction opposite to the installation direction, or locking a female receiving element on the axially projecting latching head of the cylinder-like connection structure by a relative movement of the receiving element relative to the male coupling element in a connection direction opposite to the installation direction.

The connection method according to the disclosure may comprise the further step: arranging a male coupling element in a component opening of the first component as a male bolt element or arranging a female coupling element in a component opening of the first component as a female receiving element.

According to the disclosure, the connection method is characterized by the steps: radially inwardly deforming one circumferential or a plurality of springy locking webs on a radial outer side of the connection structure by means of the second component and receiving an edge of the component opening in an installation gap between locking web and head section. In addition, the connection method may be characterized in that the female or male coupling element can be attached only via a one-sided accessibility on the second component and connected to the male bolt element or the female receiving element. This is realized in that the hollow-cylinder-like or the cylinder-like connection structure has a coordinated integral locking structure for the component opening and another structure for attaching the male bolt element or the female receiving element.

Since this design makes only a one-sided engagement of an installation force necessary, the two-part plug-in couplings according to the invention can be installed by one-sided access. In a further embodiment, the connection with the second component with only one-sided accessibility can be established, if the bolt is already attached with latching head in the component.

The present disclosure also includes a manufacturing method for a female and a male coupling element according to one of the embodiments described above. This manufacturing method comprises the following steps: providing an injection mold with the negative geometric features of the female or male coupling element, filling the injection mold with an elastomer by injection molding and cooling the injection mold and demolding the female or male coupling element from the injection mold.

4. BRIEF DESCRIPTION OF THE ACCOMPANYING DRAWINGS

Figure 2:
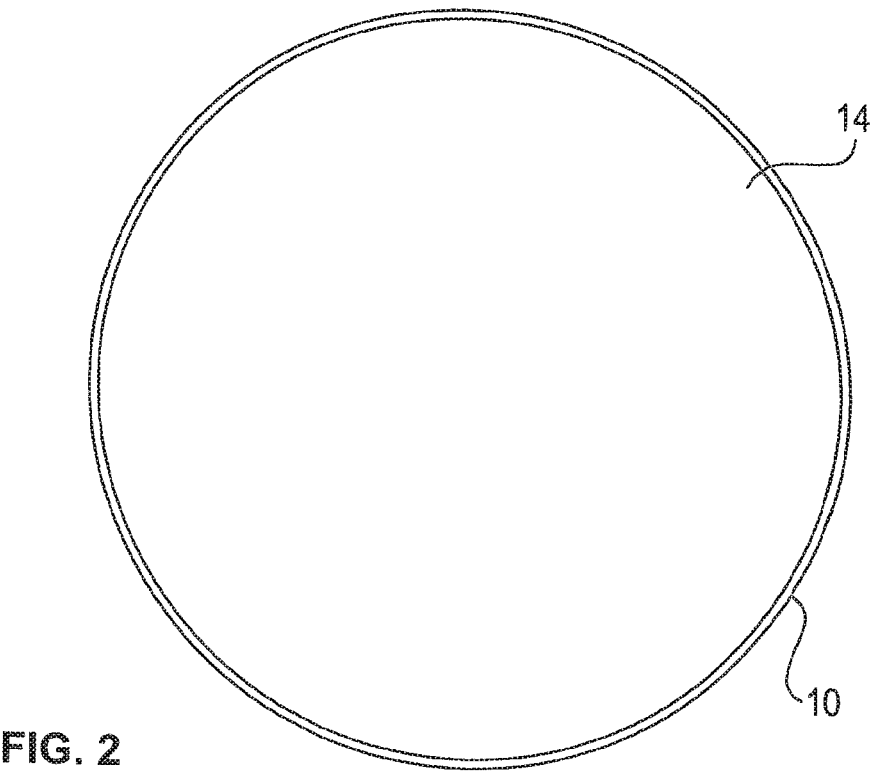
Figure 3:
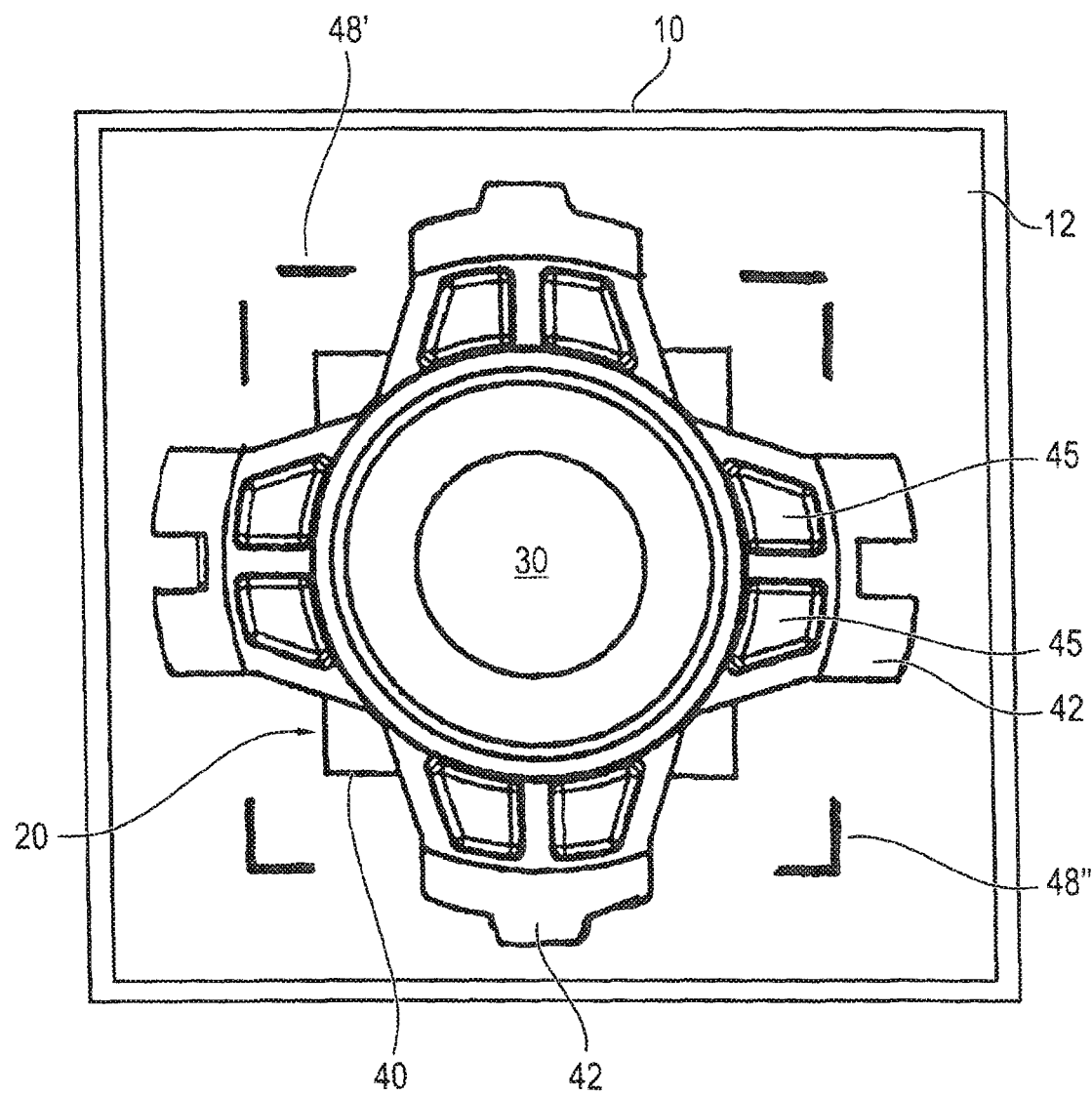
Figure 4:
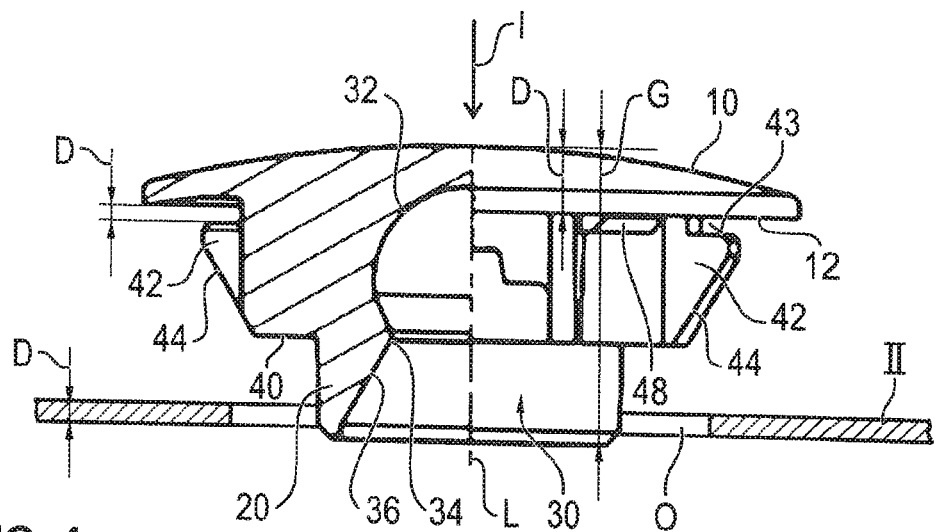
Figure 5:
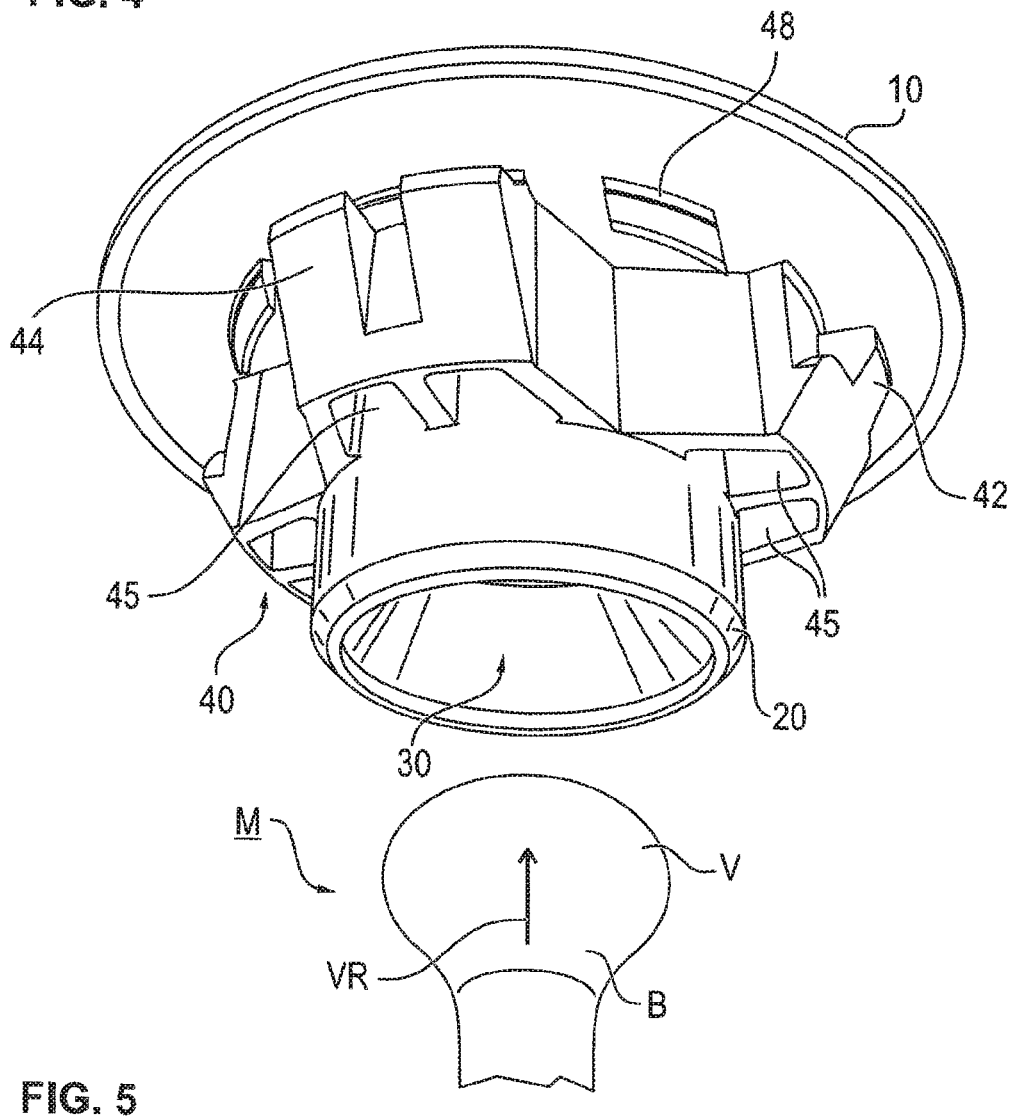
Figure 6:
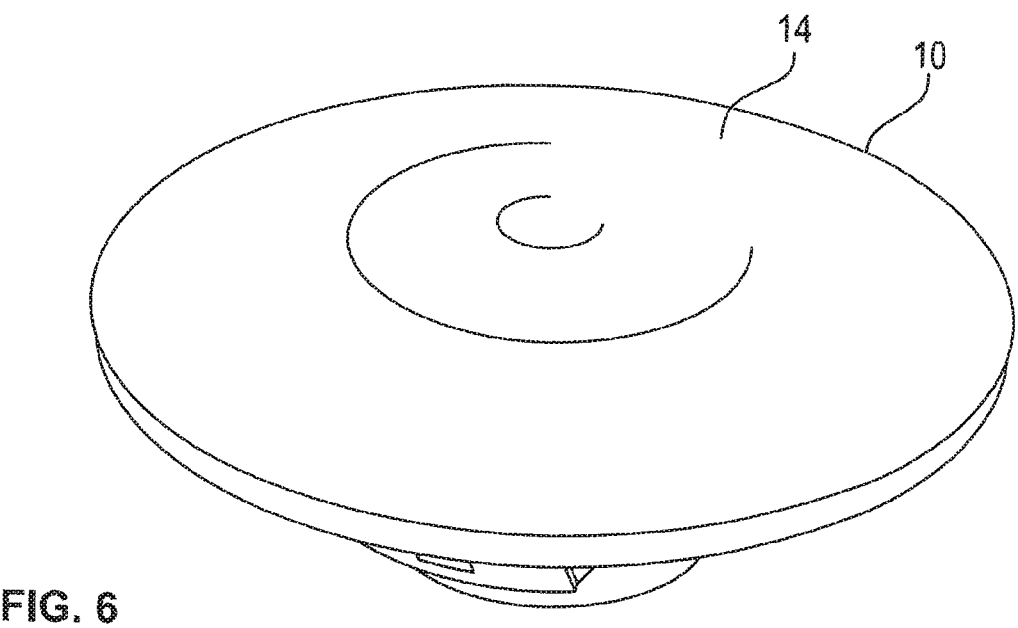
Figure 7:
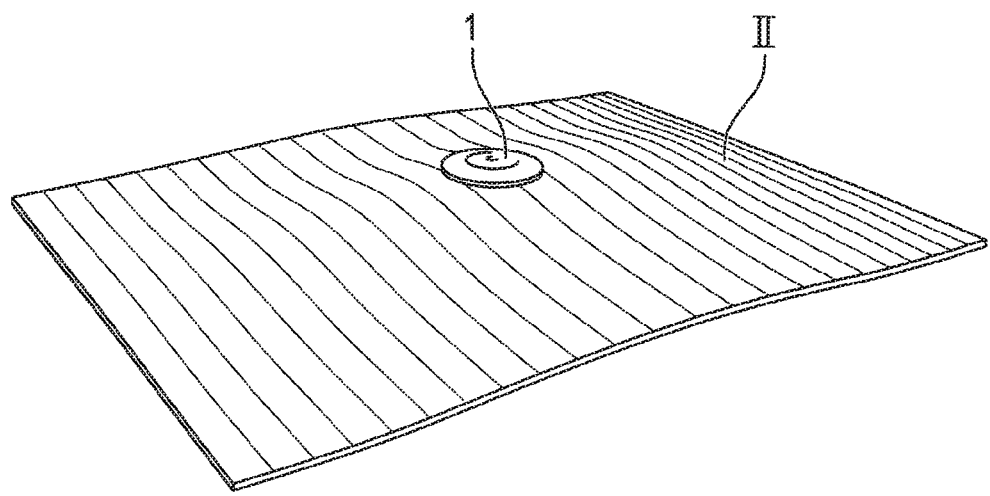
Figure 8:
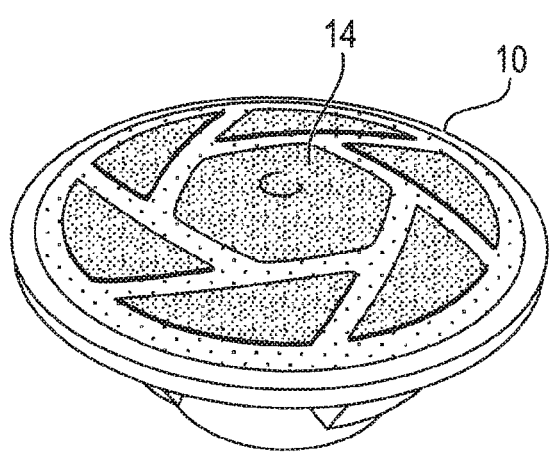
Figure 9:
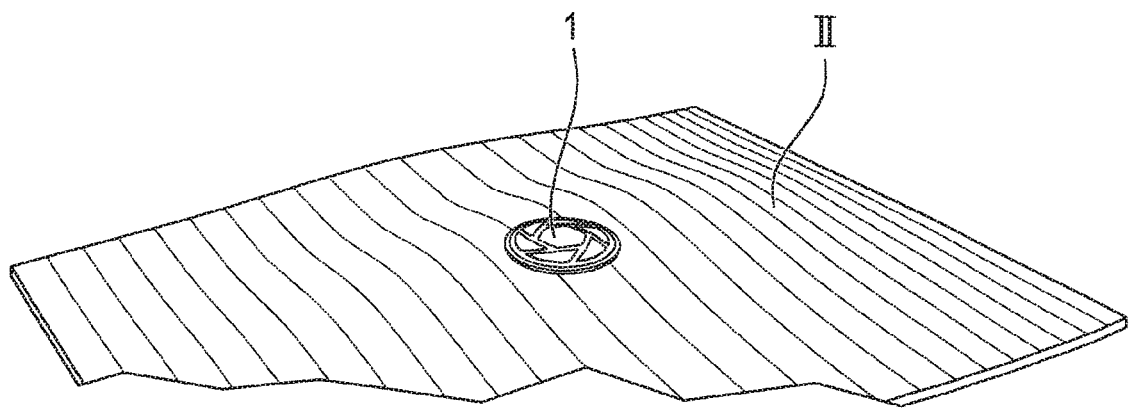
Figure 10:
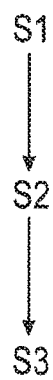
Figure 11:
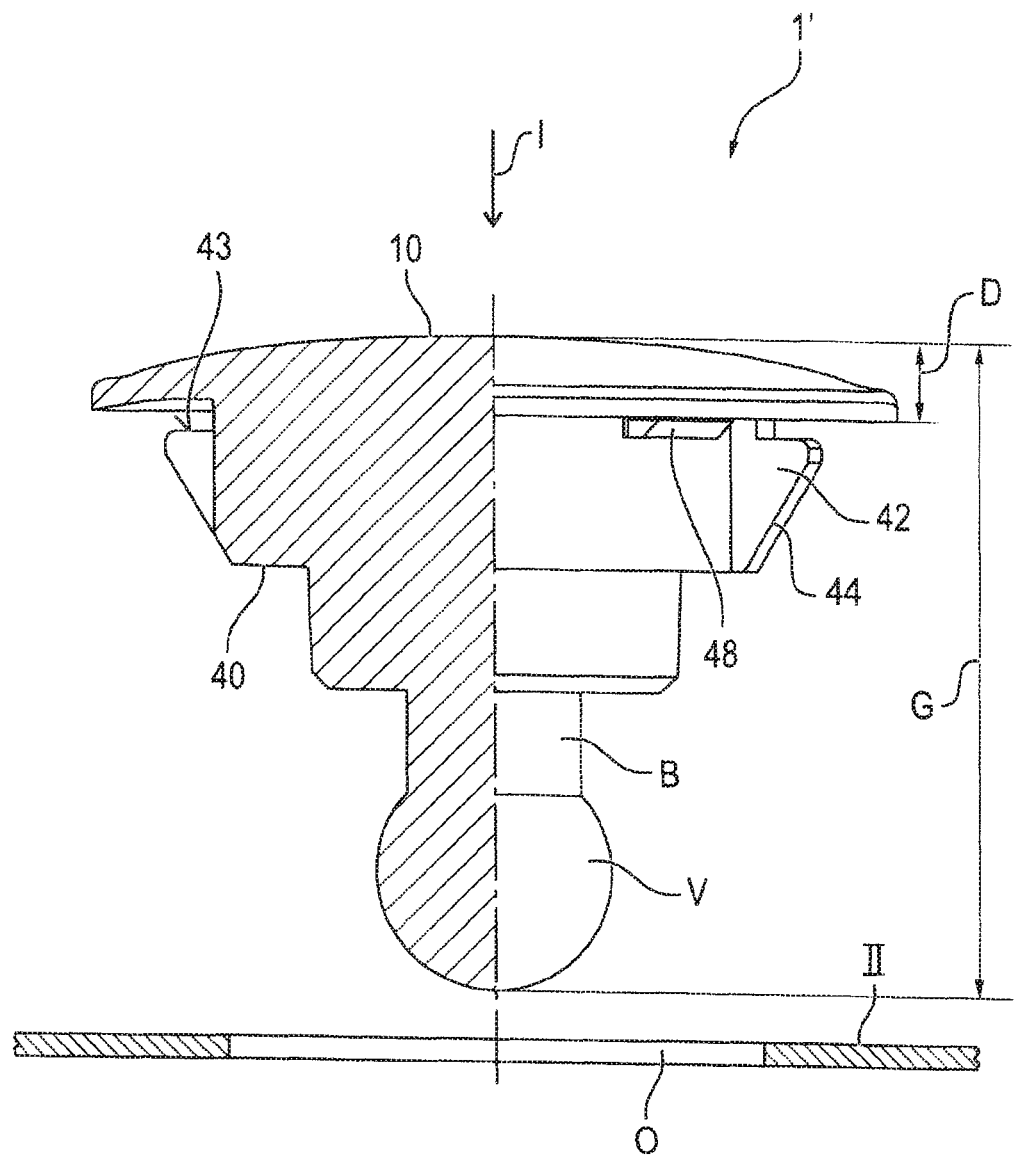

Representative embodiments of the present disclosure will be explained in more detail with reference to the accompanying drawings. It shows:

FIG. 1 is a view against an installation direction of an embodiment of the female coupling element, FIG. 2 is a top view of a head section of the female coupling element, FIG. 3 is a further embodiment of the female coupling element in a view opposite to the installation direction, FIG. 4 is a sectional view of the female coupling element according to FIG. 1, FIG. 5 is a perspective view of the female coupling element according to FIG. 1, FIG. 6 is another perspective view of the female coupling element according to FIG. 1, FIG. 7 shows an installed female coupling element in the second component, FIG. 8 is a perspective view of the female coupling element with a preferred design of the head section, FIG. 9 shows an installed female coupling element in a second component with a design of the head section, FIG. 10 is a flowchart of a connection method of two components using a two-piece plug-in coupling, and FIG. 11 is a partial sectional view of an embodiment of a male coupling element.

5. DETAILED DESCRIPTION

According to the present disclosure, two components I, II are connected via a two-part plug-in coupling comprising a female coupling element 1 and a male bolt element M. The male bolt element M is made of bolt B having at one end a latching head V and at another end a fastening structure S (not shown). The latching head V may be a ball head or another thickened structure with respect to a cross section of the bolt B. The fastening structure S may be made of a thread, an adhesive end, a rivet structure or the like to fasten the bolt B in or on the first component I. Usually, the fastening structure S or the bolt B is arranged in a component opening of the component I. If the component opening of the component I has a round shape and the bolt B or the fastening structure S has a matching outer contour, a press fit between component I and bolt B may ensure a rotation lock between component I and bolt B. This rotation lock may also be realized with the help of an asymmetric or non-circular shape of the component opening of the component I. In the same way, a round opening in combination with a radial groove for receiving a blocking radial web can be used as an asymmetrical shape. In coordination with the shape of the component opening, on its fastening structure S, the bolt B has a shape which is adjusted to the component opening at least in its outer contour. This ensures that in addition to a possible press fit between component I and bolt B, the rotation lock prevents an axial rotation of the bolt B with respect to the component I.

The second component II comprises a component opening O (see FIG. 4). The female coupling element 1 is lockingly fastened in the component opening O. The component opening O may have a shape that prevents rotation of the female coupling element 1 relative to the component II. Such shapes may be non-circular, for example elliptical, lemon-shaped, polygonal, such as a hexagon, heptagon or octagon, or asymmetric. In order to lockingly fasten the female coupling element 1 in the component opening O in axial direction and may also protectively fasten it against rotation relative to the component II, the female coupling element 1 is adapted to the shape of the component opening O in a structural area which engages in the component opening O. The outer cross-sectional shape of the outer side 40 of the female coupling element 1 may be adapted to the shape of the component opening O. This shaping ensures that the outer side 40 can be supported at the edge of the component opening O after installation in the component opening O.

The present disclosure also comprises a male coupling element 1', which is fastened in the same way and based on the same structural design as the female coupling element 1 in the component opening O and can be inserted into a female receiving element (see FIG. 11). Therefore, the embodiments described below for the female coupling element 1 apply in the same way to the male coupling part 1'. A difference exists only in the male cylinder-like connection structure 20' in comparison to the female hollow-cylinder-like connection structure 20. The male connection structure 20' is formed bolt-like with a thickened axial latching end V, and may be a ball head or the like.

The first I and the second component II may be provided each with a component opening O. On this constructive basis, a female or male coupling element 1; 1' in the component opening O of the first component I and a male or female coupling element 1'; 1 is arranged in the component opening O of the second component II. Subsequently, a connection between the components I, II via the coupling elements 1, 1' complementary to one another is established by the male coupling element 1' being fastened lockingly, but may be releasably in the female coupling element 1.

While the first component I is often a stable structure component, such as a body component, a motor block or gear block or another supporting component, the second component II may describe a cover, a cladding or the like. The second component II may be made of plastic, fiber-reinforced plastic, sheet metal, a fiber mat, carbon or the like.

The female and male coupling elements 1, 1' comprise a face-like head section 10. After installing the female or male coupling element 1, 1' in the component opening O in installation direction I, the head section 10 completely covers the component opening O. In this way, penetration of foreign substances, such as dust and moisture into the component opening O is avoided.

Perpendicular to the head section 10, a hollow-cylinder-like connection structure 20 extends at the female coupling element 1. The hollow-cylinder-like connection structure 20 has a radial inner side 30 and a radial outer side 40. The radial inner side 30 and the radial interior of the connection structure 20 serve to receive and lock the bolt B with the latching head V (see FIG. 5). Therefore, the radial inner side 30 may comprise a ball socket 32 or a similar structure for receiving the latching head V. Below the ball socket 32 is a radially inwardly projecting locking web 34, which is formed circumferentially or with cut-outs. This locking web 34 is pressed radially outwards when inserting the bolt B with latching head V, so that the latching head V can snap into the ball socket 32. Thereafter, the locking web 34 springs radially inwardly and locks the male coupling element B in the interior of the hollow-cylinder-like connection structure 20. A funnel-shaped insertion opening 36 serves to facilitate an insertion of the bolt B in the connection structure 20'. In comparison, the male cylinder-like connection structure 20' has no radial inner side 30 (see FIG. 11). The radial outer side 40 of the male cylinder-like connection structure 20' is designed in the same way.

While the inner side 30 may have a circular cross-section, the outer side 40 of the connection structure 20 may be circular-shaped (FIG. 1) or angular-shaped (FIG. 3) in its cross-section. The outer cross-sectional shape of the outer side 40 may be adapted to the shape of the component opening O. This shaping ensures that the outer side 40 can be supported at the edge of the component opening O after installation in the component opening O. This supports the grip of the female and male coupling element 1, 1' in the second component II.

FIG. 3 shows an embodiment of the outer side 40, which is radially inwardly offset and therefore is not supported by the edges of the component opening O. The additional support is realized by radial webs 48', 48" (see below). These may engage at the lateral edge of the component opening O (see 48') and/or in a corner region of the component opening O (see 48"). The same embodiment may be realized in the male coupling element 1'.

Different embodiments of the female coupling element 1 are shown in FIGS. 1 and 3 in a view from below. The connection structure 20 of FIG. 1 has a circular-shaped outer side 40 in cross-section. The connection structure 20 of FIG. 3 has an angular, in particular quadrangular, outer side 40 in cross-section.

According to the shape of the component opening O, the shape of the head section 10 can be adapted to the shape of the component opening O or can be freely chosen. Therefore, a cross-sectionally circular-shaped outer side 40 may be combined with an angular head section 10.

For fastening the female and the male coupling element 1, 1' in the component opening O, the outer side 40 has an integrally formed locking structure 42, 48. A circumferential or a plurality of uniformly arranged radially outwardly projecting springy latching webs 42 may be provided, spaced by a component thickness D of the second component II, at a bottom side 12 of the head section 10.

The latching webs 42 may have a support surface 43 facing the bottom side 12 of the head section 10, which may run perpendicular to the longitudinal axis of the female coupling element 1. Between the support surface 43 and the head bottom side 12 an installation gap is defined in this way, in which the second component II is received. For a press fit of the component II in the installation gap, the latter may be narrower than the thickness of component II. This is ensured by a tight-fitting and preferably sealing seat of the bottom side 12 on the component II.

In order to be able to insert the connection structure 20 as accurately as possible in the component opening O, the connection structure 20, 20' may be dimensioned only slightly smaller than the extension of the component opening O. Inlet bevels 44 support the insertion of the female and male coupling element 1, 1' in the component opening O. By supporting the inlet bevels 44 at the edge of the component opening O during insertion, the latching webs 42 may be deformed radially inwards. This allows the latching webs 42 to pass through the component opening O and the second component II being locked between the support surfaces 43 and the bottom side 12 of the head section 10. The deformation of the latching webs 42 is ensured by the production of the female and male coupling element 1, 1' of an elastic material, which may be an elastomer. This deformation is supported according to a further embodiment of the present disclosure by providing at least one cavity 45 in each latching web 42. To further ensure the stability of the latching webs 42, two adjacent cavities 45 may be separated from one another in a locking web by an intermediate wall 46.

In order to additionally secure the female and male coupling elements 1, 1' in the component opening O, a plurality of radial webs 48, 48', 48" are provided on the bottom side 12 of the head section 10. The radial webs 48, 48', 48" extend parallel to the longitudinal axis L and may have a bevel 49. The bevel 49 is arranged on the radial outer side of the radial web 48 and is headed radially inwards in installation direction I.

While inserting the female and male coupling element 1, 1' in the component opening O, the radial webs 48, 48', 48" engage in the component opening O in axial direction. After engagement, the radial webs 48, 48', 48" may form an undercut against a radial or lateral displacement of the female or male coupling element 1, 1' within the component opening O.

The female and male coupling element 1, 1' may show an overall axial length G (see FIGS. 4 and 11). Due to the embodiment of the head section 10, the latter has an axial thickness D, thus a maximum projection over the surface of the second component II in the range of 5% to 25%, preferably 5 to 15%, of the total axial length G of the female coupling element 1. By this positioning of the head section 10, the latter adapts to the surface of the second component II and does not block assembly space above the second component II.

An upper side 14 of the head section 10 may be colored, structured, haptically designed, printed and/or provided with inlays.

To install the female and male coupling elements 1, 1', they are inserted in installation direction I into the component opening O of the second component II and/or the first component I (step S1). The hollow-cylinder-like or the cylinder-like connection structure 20, 20' is moved as far in installation direction I in the component opening O until the latching webs 42 lock in the component opening O (step S2). At the same time, the bottom side 12 of the head section 10 may be supported at the second component II. For this installation, a one-sided accessibility of the second component II is sufficient.

In order to fasten or lock the female coupling element 1 with the bolt B with latching head V fastened to the first component I, the female coupling element 1 is pushed further in the direction of installation I onto the bolt B with latching head V. The same applies if the bolt B is formed by a male coupling part 1'.

This results in a relative movement of the male bolt element M or the male coupling part 1' with respect to the female coupling element 1 in a connecting direction VR opposite to the installation direction I (step S3). This connection between the first and second component can also be realized with only one-sided accessibility. Analogously, the male coupling element 1' is further pushed in the installation direction I in the female receiving element or in a female coupling part 1 and is locked there. The bolt element M or the male coupling element 1' and the female receiving element or the female coupling element 1 may be moved into or onto the coupling element 1, 1' and to lock it there.

Certain embodiments or components or features of components have been noted herein as being "preferred" and such indications are to be understood as relating to a preference of the applicant at the time this application was filed. Such embodiments, components or features noted as being "preferred" are not required for implementation of the inventions disclosed herein unless otherwise indicated as being required, or unless specifically included within the claims that follow.

The invention claimed is:
1. A female coupling element of a two-part plug-in coupling, which has the following features:
  a. an areal head section from which a female connection structure extends perpendicularly and in an installation direction of the female coupling element, wherein
  b. the female connection structure has the shape of a hollow-cylinder and comprises on a radial inner side a radially inwardly projecting locking web, so that a male bolt element can be inserted in the female connection structure against the installation direction and the male bolt element can be locked in the female connection structure, and
  c. the female coupling element has on an outer radial side an integral locking structure with a circumferential outwardly projecting springy latching web or a plurality of uniformly arranged outwardly projecting springy latching webs which form an installation gap with the areal head section for receiving a component, so that the female coupling element can be locked in installation direction in an opening of the component with a relative movement between the female coupling element and the component, and
  d. in which the areal head section provides a completely closed face opposite to the installation direction, which has a round or angled shape, so that the hollow-cylinder of the female connection structure is closed at the areal head section.

2. The female coupling element according to claim 1, in which the circumferential outwardly projecting springy latching web or the plurality of outwardly projecting springy latching webs define support surfaces extending opposite to the areal head section, which limit the installation gap.

3. The female coupling element according to claim 1, in which the circumferential outwardly projecting springy latching web or the plurality of outwardly projecting springy latching webs comprise inlet bevels declined in installation direction, so that the circumferential outwardly projecting springy latching web or the plurality of outwardly springy latching webs are tapered in the installation direction.

4. The female coupling element according to claim 1, in which the circumferential outwardly projecting springy latching web or the plurality of outwardly projecting springy latching webs have an inner cavity, so that the outwardly projecting springy latching web or the outwardly projecting springy latching webs are radially inwardly deformable.

5. The female coupling element according to claim 1, in which the female connection structure has a round or an angular outer contour in adaptation to a shape of the opening in the component.

6. The female coupling element according to claim 1, in which the areal head section extends in radial direction with respect to an axial longitudinal axis of the female coupling element beyond a radial or lateral extent of the circumferential outwardly projecting springy latching web or the plurality of outwardly projecting springy latching webs.

7. The female coupling element according to claim 1, in which the areal head section has an axial thickness adjacent to the installation gap and opposite to the installation direction in the range of 5% to 25% of a total axial length of the female coupling element.

8. The female coupling element according to claim 1, in which the radial inner side of the female connection structure has a ball socket and the radially inwardly projecting locking web is formed circumferentially continuous or with cut-outs.

9. A male coupling element of a two-part plug-in coupling, which has the following features:
  a. an areal head section from which a male connection structure extends perpendicularly and in an installation direction of the male coupling element, wherein
  b. the male connection structure has the shape of a cylinder and comprises an axially extending bolt with a latching head, so that the male connection structure can be inserted in a female receiving element and the male connection structure can be locked in the female receiving element, and c. the male coupling element has on an outer radial side an integral locking structure with a circumferential outwardly projecting springy latching web or a plurality of uniformly arranged outwardly projecting springy latching webs which form an installation gap with the areal head section for receiving a component, so that the male coupling element can be locked in installation direction in an opening of the component with a relative movement between the male coupling element and the component.

10. The male coupling element according to claim 9, in which the circumferential outwardly projecting springy latching web or the plurality of outwardly projecting springy latching webs define support surfaces extending opposite to the areal head section, which limit the installation gap.

11. The male coupling element according to claim 9, in which the circumferential outwardly projecting springy latching web or the plurality of outwardly projecting springy latching webs comprise inlet bevels declined in the installation direction, so that the circumferential outwardly projecting springy latching web or the plurality of outwardly projecting springy latching webs are tapered in the installation direction.

12. The male coupling element according to claim 9, in which the circumferential outwardly projecting springy latching web or the plurality of outwardly projecting springy latching webs have an inner cavity, so that the outwardly projecting springy latching web or the outwardly projecting springy latching webs are radially inwardly deformable.

13. The male coupling element according to claim 9, in which the male connection structure has a round or an angular outer contour in adaptation to a shape of the opening in the component.

14. The male coupling element according to claim 9, in which the areal head section extends in radial direction with respect to an axial longitudinal axis of the male coupling element beyond a radial or lateral extent of the circumferential outwardly projecting springy latching web or the plurality of outwardly projecting springy latching webs.

15. The male coupling element according to claim 9, in which the areal head section provides a closed face opposite to the installation direction, which has a round or angled shape.

16. The male coupling element according to claim 9, in which the areal head section has an axial thickness adjacent to the installation gap and opposite to the installation direction in the range of 5% to 25% of a total axial length of the male coupling element.

17. A connection between a first component and a second component via a two-part plug-in coupling, in which a) the first component is equipped with a male bolt element with a latching head and the second component comprises a female coupling element installed in a component opening, wherein the coupling element has a female connection structure that extends perpendicularly and in an installation direction of the coupling element from an areal head section, and the female connection structure has the shape of a hollow-cylinder and comprises on a radial inner side a radially inwardly projecting locking web, so that the male bolt element can be inserted in the female connection structure against the installation direction and the male bolt element can be locked in the female connection structure, and in which the head section provides a closed face opposite to the installation direction, which has a round or angled shape; or b) the first component is equipped with a female receiving element and the second component comprises a male coupling element installed in a component opening, wherein the coupling element has a male connection structure that extends perpendicularly and in an installation direction of the coupling element from an areal head section, and the male connection structure has the shape of a cylinder and comprises an axially extending bolt with a latching head, so that the male connection structure can be inserted in a female receiving element and the male connection structure can be locked in the female receiving element, and the coupling element has on an outer radial side an integral locking structure with a circumferential outwardly projecting springy latching web or a plurality of uniformly arranged outwardly projecting springy latching webs which form an installation gap with the head section for receiving a component, so that the coupling element can be locked in installation direction in an opening of the component with a relative movement between the coupling element and the component; or c) the first component comprises a female coupling element installed in a component opening and the second component comprises a male coupling element installed in a component opening, wherein the coupling element of the first component has a female connection structure that extends perpendicularly and in an installation direction of the coupling element from an areal head section, and the female connection structure has the shape of a hollow-cylinder and comprises on a radial inner side a radially inwardly projecting locking web, so that the male bolt element can be inserted in the female connection structure against the installation direction and the male bolt element can be locked in the female connection structure, and in which the head section provides a closed face opposite to the installation direction, which has a round or angled shape, and wherein the coupling element of the second component has a male connection structure that extends perpendicularly and in an installation direction of the coupling element from an areal head section, and the male connection structure has the shape of a cylinder and comprises an axially extending bolt with a latching head, so that the male connection structure can be inserted in a female receiving element and the male connection structure can be locked in the female receiving element, and the coupling element has on an outer radial side an integral locking structure with a circumferential outwardly projecting springy latching web or a plurality of uniformly arranged outwardly projecting springy latching webs which form an installation gap with the head section for receiving a component, so that the coupling element can be locked in installation direction in an opening of the component with a relative movement between the coupling element and the component.

* * * * *